(12) United States Patent
Ball

(10) Patent No.: US 6,546,573 B1
(45) Date of Patent: Apr. 15, 2003

(54) DRAIN COVER ASSEMBLY

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/197,043

(22) Filed: Jul. 17, 2002

(51) Int. Cl.[7] .............................. E03C 1/22; E03C 1/23; F16L 17/00; F16L 21/00
(52) U.S. Cl. ............................ 4/680; 4/688; 285/361; 285/402
(58) Field of Search ........................... 4/680, 681, 682, 4/683, 684, 685, 695, 688; 285/361, 396, 402, 139.1

(56) References Cited

U.S. PATENT DOCUMENTS 938,102 A  * 10/1909 Wise .............................. 4/680
4,708,370 A * 11/1987 Todd ............................ 285/12
5,897,083 A  * 4/1999 Johnson ........................ 248/75

FOREIGN PATENT DOCUMENTS

CH           329298      *  6/1958
DE        1409714(85e)   *  6/1969

* cited by examiner

*Primary Examiner*—Gregory Huson
*Assistant Examiner*—Lina R Kontos

(57) ABSTRACT

A drain cover assembly with a hollow conduit member with an open end that penetrates and extends through a drain port of a bathtub, and a drain cover with a center opening, a horizontal flange, and an integral sleeve that extends into the open end of the conduit, the sleeve having protruding elements that are received by slots on the interior of the conduit to guide and releasably secure the drain cover to the conduit.

19 Claims, 5 Drawing Sheets

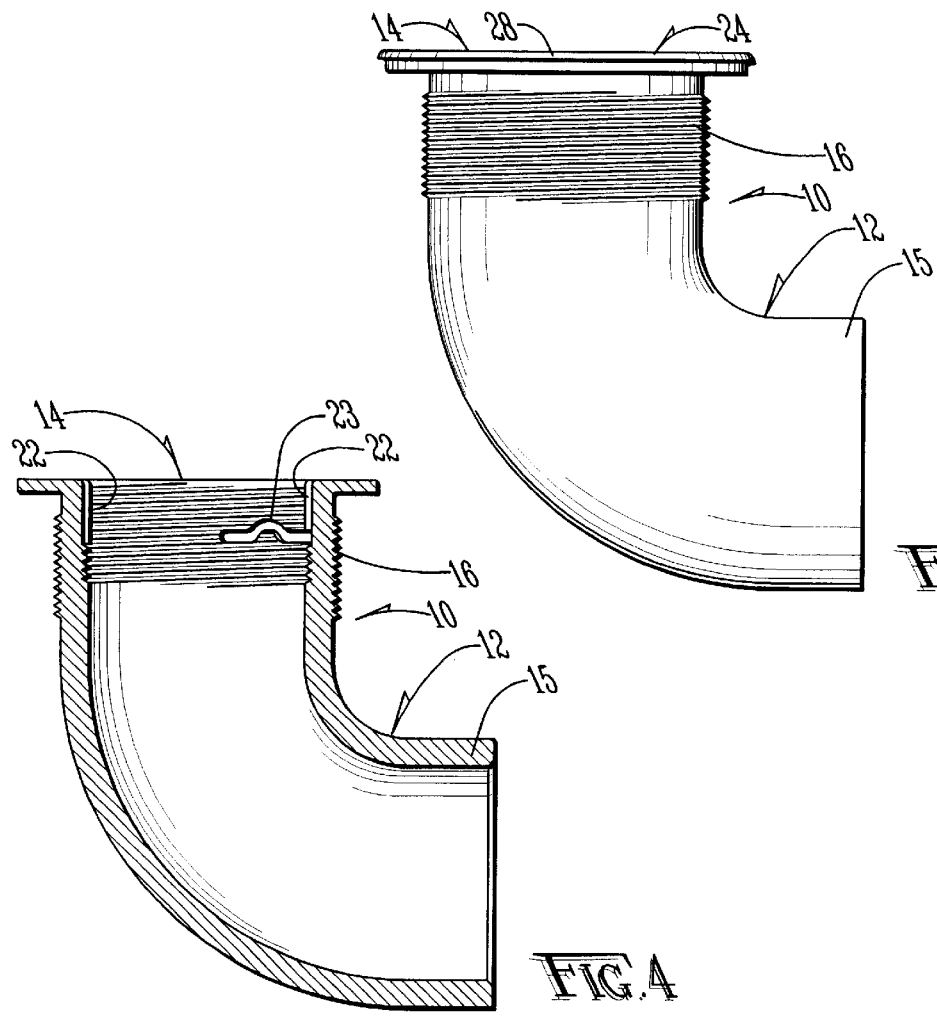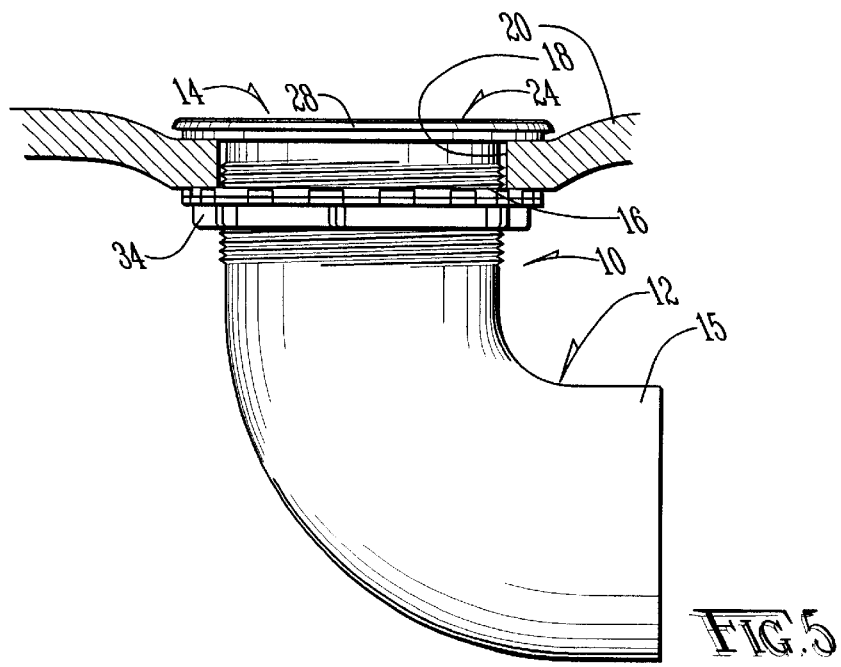

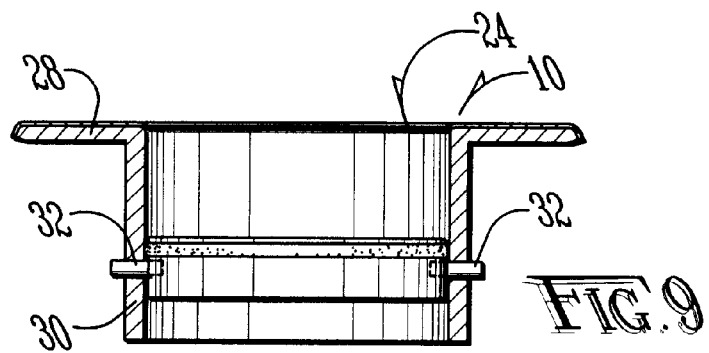
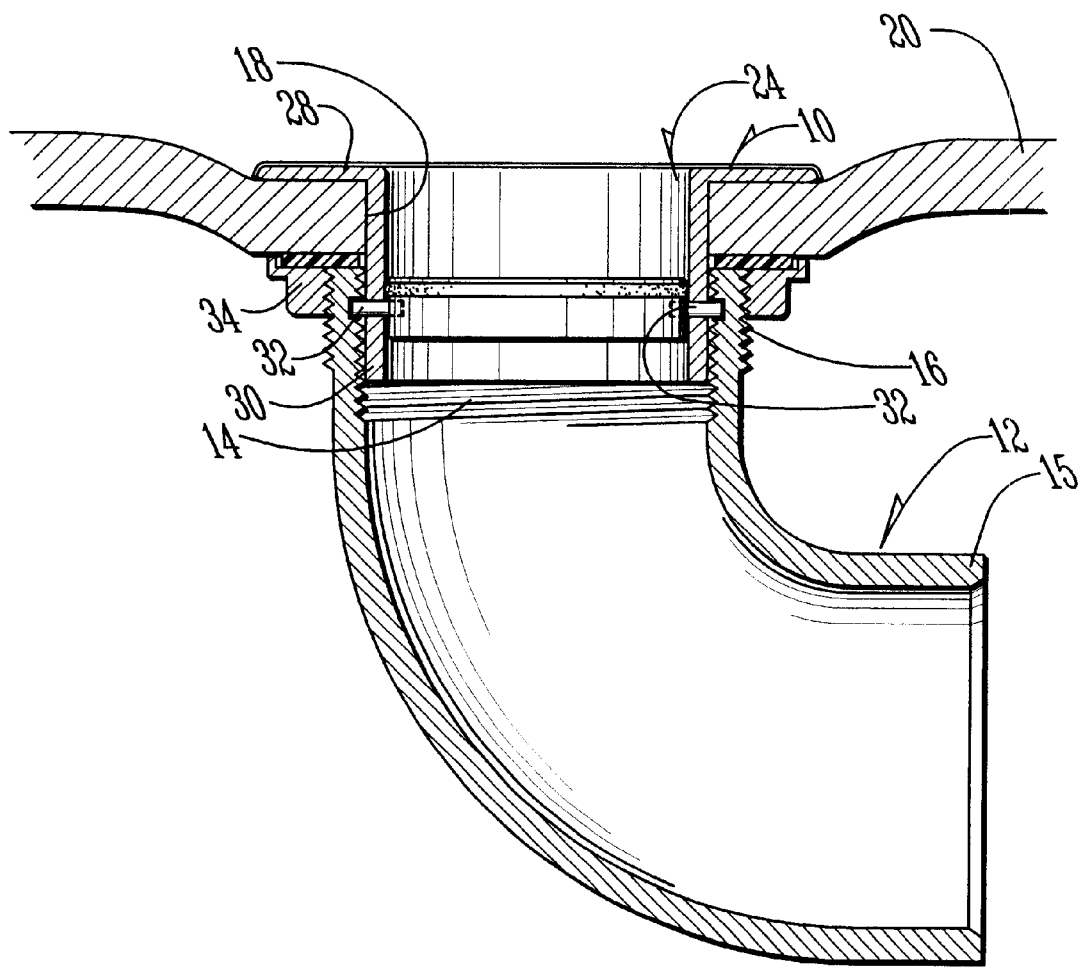

DRAIN COVER ASSEMBLY

BACKGROUND OF THE INVENTION

This invention relates to a drain cover for use with bathtubs, sinks, laundry tubs, and the like, and more particularly to drain covers that are easy to install and secure.

Bathtub drains conventionally have a cover that is adapted to fit over and around a drain port in the bottom of a tub or the like. The covers are generally connected to drain ports through the use of a sealant material. These connections require materials, labor and time for installation as well as makes removal difficult when necessary to replace drain covers because of damage or discoloration.

It is therefore a principal objective of this invention to provide a drain cover assembly wherein a drain cover can be easily, quickly, and economically installed and replaced. This and other objectives will be apparent to those skilled in the art.

SUMMARY OF THE INVENTION

The drain cover assembly of this invention has a hollow fluid conduit member that extends through a drain port in the bottom of a bathtub. A drain cover with a center opening and a horizontal flange has an integral sleeve that extends from the opening and fits into an open end of the hollow conduit member. The sleeve has a pair of protruding elements that are positioned to be received in a pair of slots in the interior of the hollow conduit member such that the drain cover can be releasably secured to the hollow conduit member.

BRIEF DESCRIPTION OF THE DRAWINGS

FIG. 3 is a side view of a drain cover assembly;

FIG. 4 is a sectional side view of a drain cover assembly taken on lines 4—4 of FIG. 8;

FIG. 5 is a side view of a drain cover assembly with a locking nut;

FIG. 9 is a sectional side view of a drain cover assembly with a drain closure;

FIG. 10 is a sectional side view of a drain cover assembly with a locking nut.

DETAILED DESCRIPTION OF THE PREFERRED EMBODIMENT

Figure 1:
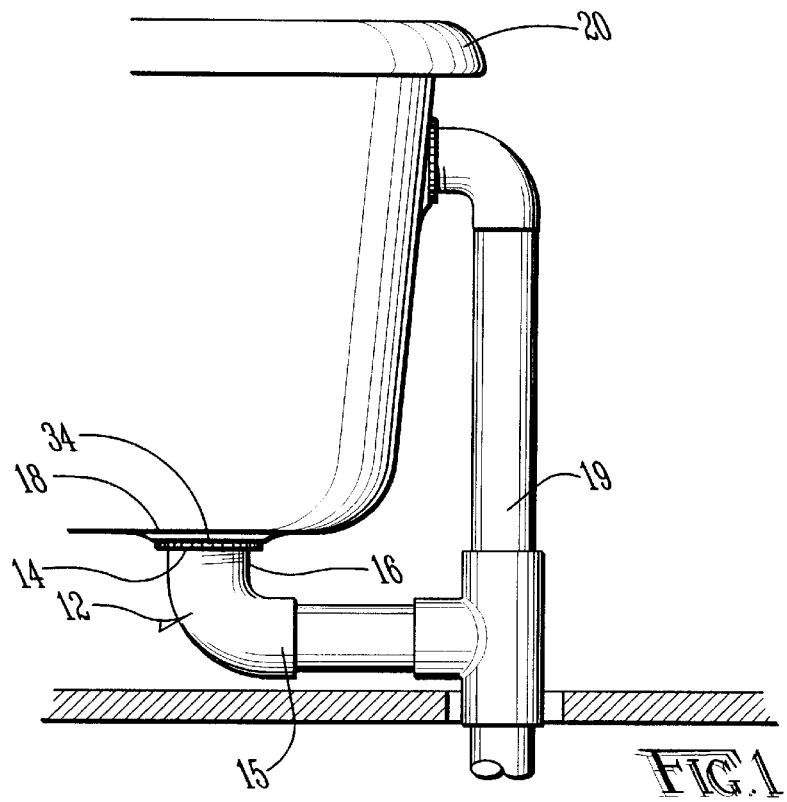
FIG. 1 is a side view of a bathtub.
Figure 2:
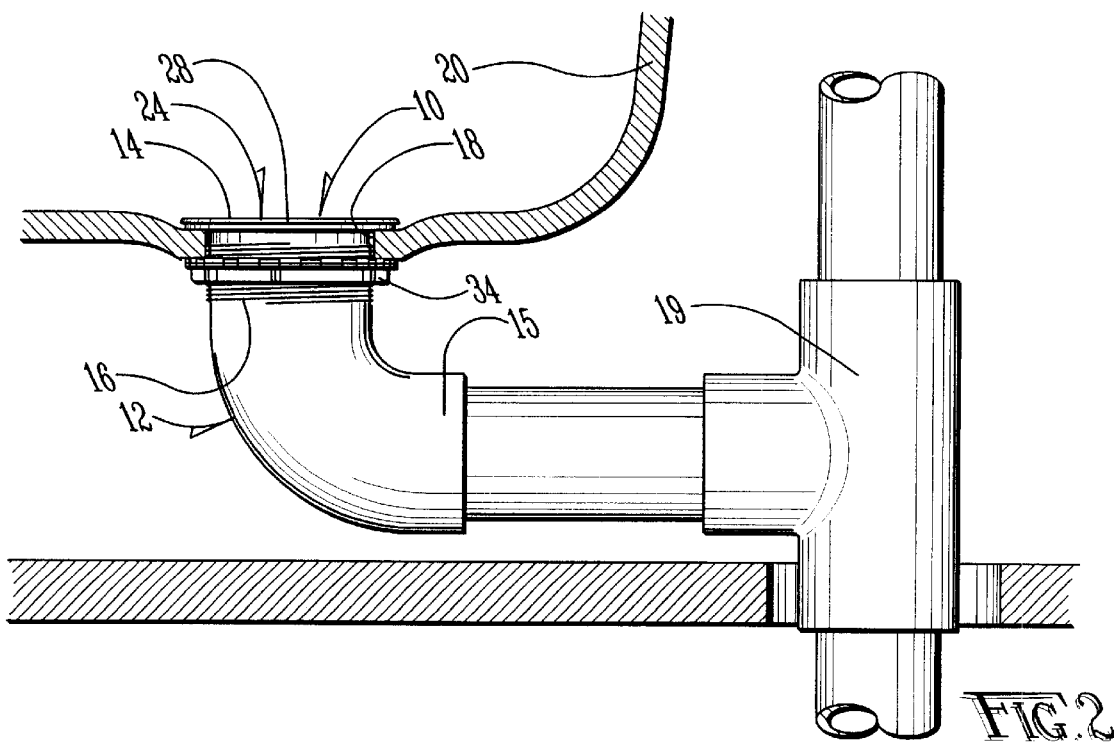
FIG. 2 is a side view of a drain cover assembly.
Figure 6:
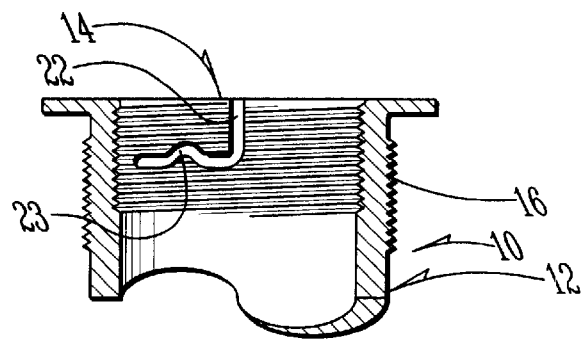
FIG. 6 is a sectional side view of a drain cover assembly taken on line 6—6 of FIG. 7.
Figure 7:
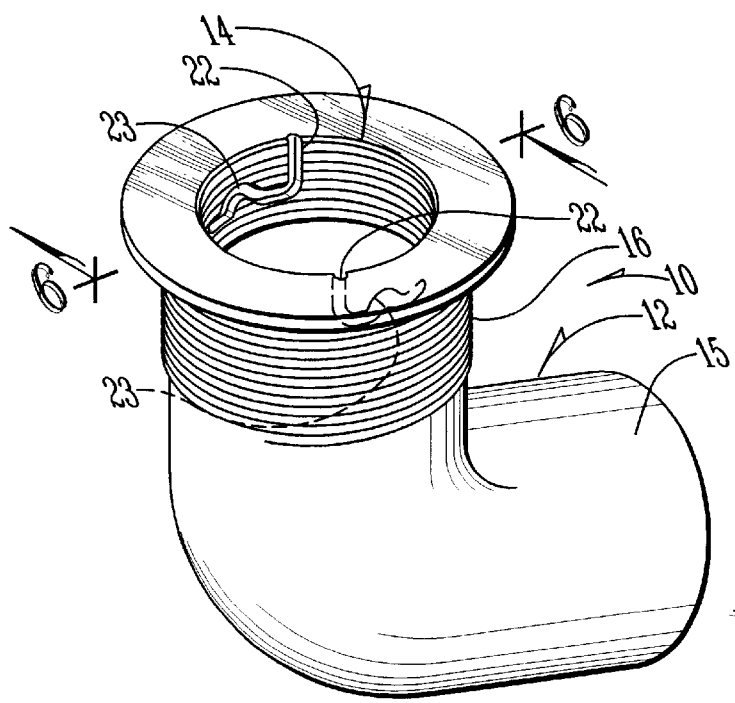
FIG. 7 is a perspective view of a drain cover assembly.
Figure 8:
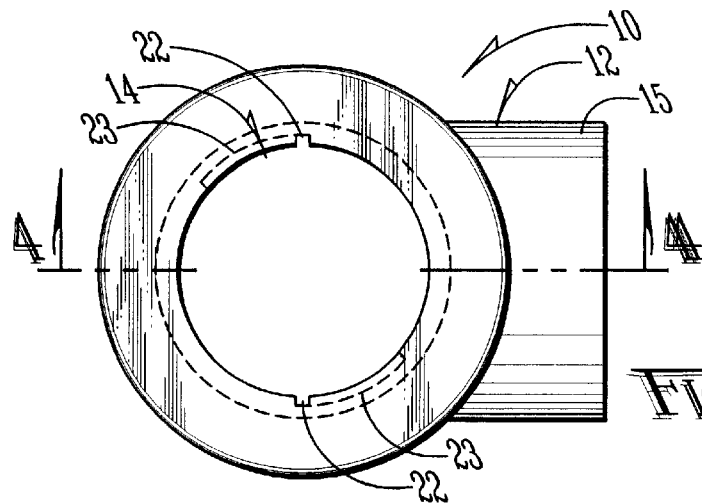
FIG. 8 is a top plan view of a drain cover assembly.
Figure 11:
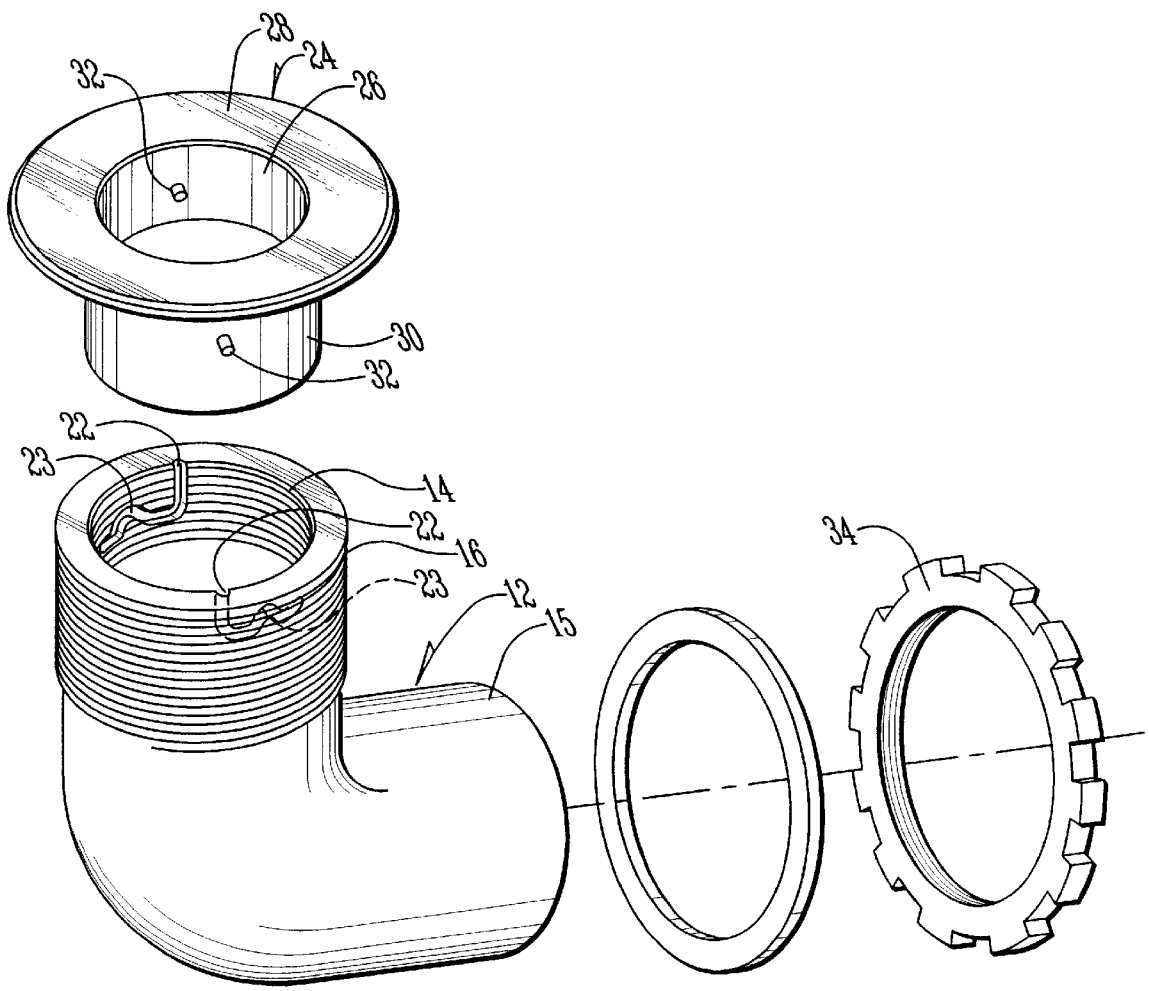
FIG. 11 is a perspective view of a drain cover assembly with a locking nut.

Referring now to the drawings, the numeral 10 generally designates the drain cover assembly. The drain cover assembly 10 has a hollow fluid conduit member 12 that has an open end 14 with external threads 16 that penetrates and extends through a drain port 18 in the bottom of a bathtub 20 (FIGS. 6 and 7). While the conduit member 12 can be of any shape, an L-shaped member 12 is preferred. (FIG. 2). The end 15 opposite the open end 14 is unthreaded and is telescopically affixed to a primary drain pipe 19 by means of an adhesive. (FIG. 2) On the interior of the conduit member 12 are a pair of slots 22 adjacent to the open end 14 of the member 12. (FIGS. 6 and 7). While the slots 22 can be made in a variety of shapes it is preferred that they have a generally longitudinal portion terminating in radial portions. In one embodiment the radial portion has an arcuate section 23 to better secure the drain cover to conduit (FIG. 11).

The drain cover assembly also has a drain cover 24 with a center opening 26, a horizontal flange 28 around the opening 26, and an integral sleeve 30 extending from the opening 26 into the open end 14 of the conduit member 12. (FIG. 11). Extending outwardly from the sleeve 30 are protruding elements 32. The protruding elements 32 are positioned to be received in the slots 22 on the interior of the conduit member 12. Depending on the shape of the slots 22 protruding elements 32 fit in the slots 22 and are guided based on the configuration of the respective slots 22 when the sleeve 30 of the drain cover is received in the open end 14 of the conduit member 12. Generally, by moving first longitudinally and thence radially the drain cover 24 is releasably secured and prevented from moving in a longitudinal direction out of the conduit member 12. To remove the drain cover 24 from the conduit member 12, the drain cover 24 is generally moved first radially and then longitudinally as the protruding elements 32 follow the configuration of the slots 22.

The drain cover assembly 10 is designed to receive any conventional drain closure assembly (not shown) such as that disclosed in U.S. Pat. No. 4,720,877, herein incorporated by reference.

The protruding elements 32 can be made of any material and formed in any shape such as pins or threaded screws. In one embodiment thread screws protrude through the sleeve 30 such that a portion of the screw extends internally of the sleeve 30 where a drain closure element, such as that disclosed in U.S. Pat. No. 6,226,806, and incorporated by reference herein, is pivotally supported. (See FIGS. 9, 10 and 11).

When the drain cover 24 is mounted in the conduit member 12, a lock nut 34 is threadably mounted on the external threads 16 of the conduit member to bind against the lower surface of the bathtub bottom 20 to rigidly affix the drain cover assembly 10 to the drain port 18. (FIGS. 5, 10 and 11).

Apparent from this description is a unique drain cover assembly that incorporates new desirable features and avoids the disadvantages of other drain cover assemblies. The construction takes full advantage of the desirable feature of providing a drain cover that is simple and easy to assemble, install and remove.

From the foregoing, it will be seen that this invention is one well adapted to attain all the ends and objectives hereinabove set forth with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A drain cover assembly for a bathtub drain or the like having a drain port, comprising:

a hollow fluid conduit member having an open end for penetrating and extending through the drain port in the bottom of the bathtub, and having external threads;

a drain cover with a center opening, a horizontal flange around the opening and an integral sleeve extending from the opening into the open end of the conduit member;

a pair of slots in the interior of the conduit member adjacent the open end; and protruding elements extending outwardly from the sleeve and positioned to be received in the pair of slots so as to guide the sleeve of the drain cover as the drain cover is moved into the open end of the conduit and thence releasably secured to the conduit member.

2. The assembly of claim 1 wherein means are provided for the attachment of a drain closure assembly to the drain cover assembly.

3. The assembly of claim 1 wherein the protruding elements are a pair of oppositely disposed pins.

4. The assembly of claim 1 wherein the protruding elements are threaded screws.

5. The assembly of claim 4 wherein the screws extend completely through side walls of the sleeve of the drain cover to pivotally support a drain closure assembly.

6. The assembly of claim 1 wherein the hollow fluid conduit is an L-shaped member.

7. The assembly of claim 1 wherein a lock nut is threadably mounted on the external threads of the conduit member to bind against the bathtub to rigidly affix the drain cover assembly to the drain port of the bathtub when the drain cover is mounted in the open end of the conduit.

8. The assembly of claim 1 wherein the conduit member has an unthreaded open end opposite the open end for penetration into the drain port of the bathtub, wherein the unthreaded open end can be telescopically affixed to an unthreaded primary drain pipe by means of an adhesive.

9. The assembly Qf claim 1 wherein the pair of slots have longitudinal portions and radial portions.

10. The assembly of claim 9 wherein the radial portion of the pair of slots have arcuate portions.

11. A drain cover assembly for a bathtub drain or the like having a drain port, comprising:

a hollow fluid conduit member having an open end for penetrating and extending through the drain port in the bottom of the bathtub, and having external threads;

a drain cover with a center opening, a horizontal flange around the opening and an integral sleeve extending from the opening into the open end of the conduit member;

a pair of slots in the interior of the conduit member adjacent the open end and having longitudinal portions terminating in radial portions; and protruding elements extending outwardly from the sleeve and positioned to be received in the pair of slots so as to guide the sleeve of the drain cover longitudinally therein and thence radially, respectively, so as to follow the configuration of the respective slots when the sleeve of the drain cover is moved first longitudinally into the open end of the conduit and thence radially to releasably secure the drain cover against longitudinal movement out of the conduit member.

12. The assembly of claim 11 wherein means are provided for the attachment of a drain closure assembly to the drain cover assembly.

13. The assembly of claim 11 wherein the protruding elements are a pair of oppositely disposed pins.

14. The assembly of claim 11 wherein the protruding elements are threaded screws.

15. The assembly of claim 14 wherein the screws extend completely through side walls of the sleeve of the drain cover to pivotally support a drain closure assembly.

16. The assembly of claim 11 wherein the hollow fluid conduit is an L-shaped member.

17. The assembly of claim 11 wherein a lock nut is threadably mounted on the external threads of the conduit member to bind against the bathtub to rigidly affix the drain cover assembly to the drain port of the bathtub when the drain cover is mounted in the open end of the conduit.

18. The assembly of claim 11 wherein the conduit member has an unthreaded open end opposite the open end for penetration into the drain port of the bathtub, wherein the unthreaded open end can be telescopically affixed to an unthreaded primary drain pipe by means of an adhesive.

19. The assembly of claim 11 wherein the radial portions of the pair of slots have arcuate portions.

* * * * *